No. 633,495. Patented Sept. 19, 1899.
G. W. W. SWEENEY.
MAIL CART.
(Application filed Feb. 1, 1899.)
(No Model.) 2 Sheets—Sheet 1.
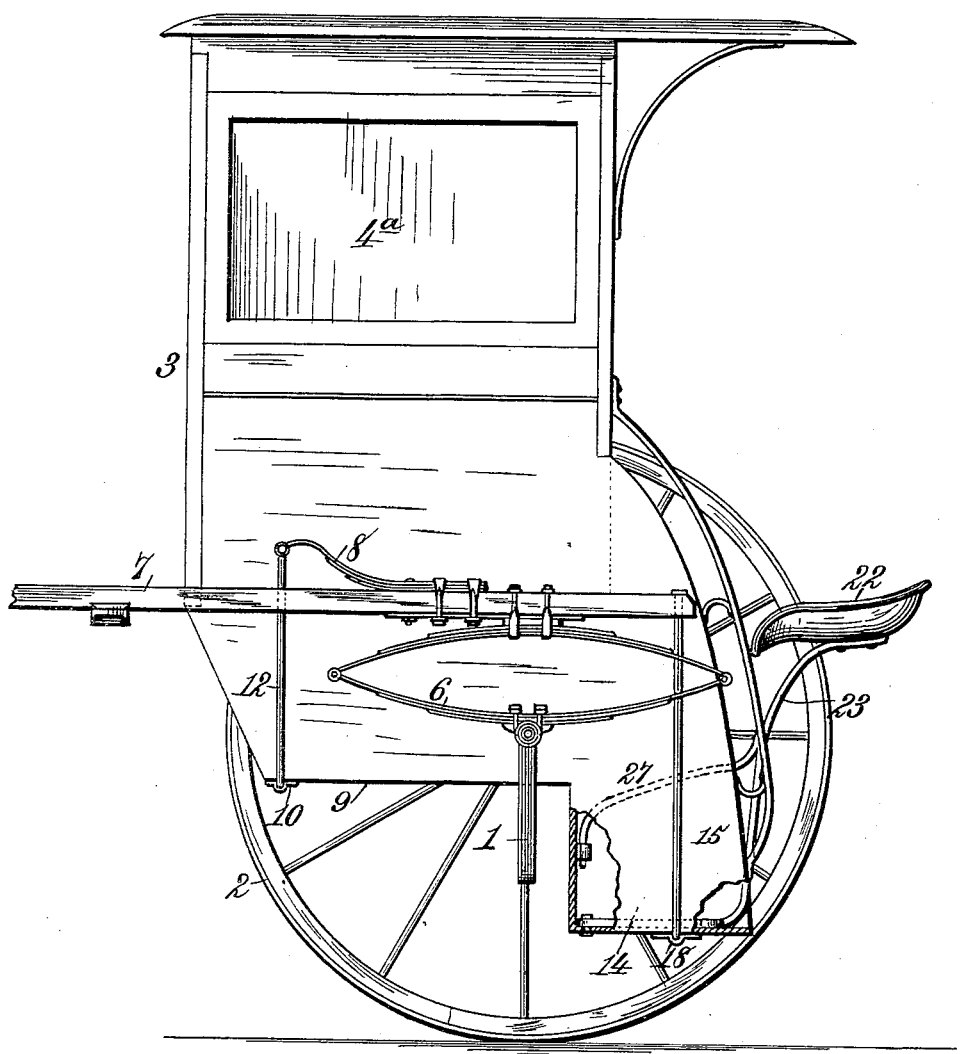
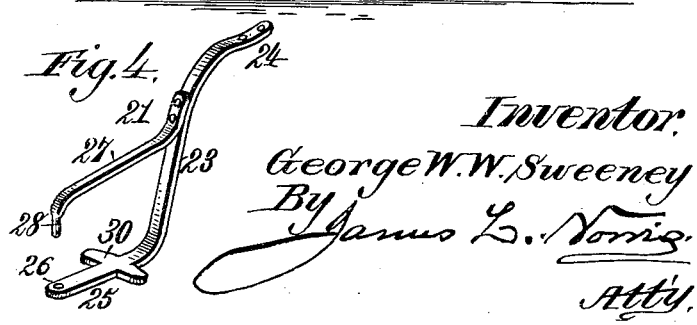
Witnesses. Inventor.
George W. W. Sweeney
By James L. Norris
Atty.

No. 633,495. Patented Sept. 19, 1899.
G. W. W. SWEENEY.
MAIL CART.
(Application filed Feb. 1, 1899.)
(No Model.) 2 Sheets—Sheet 2.
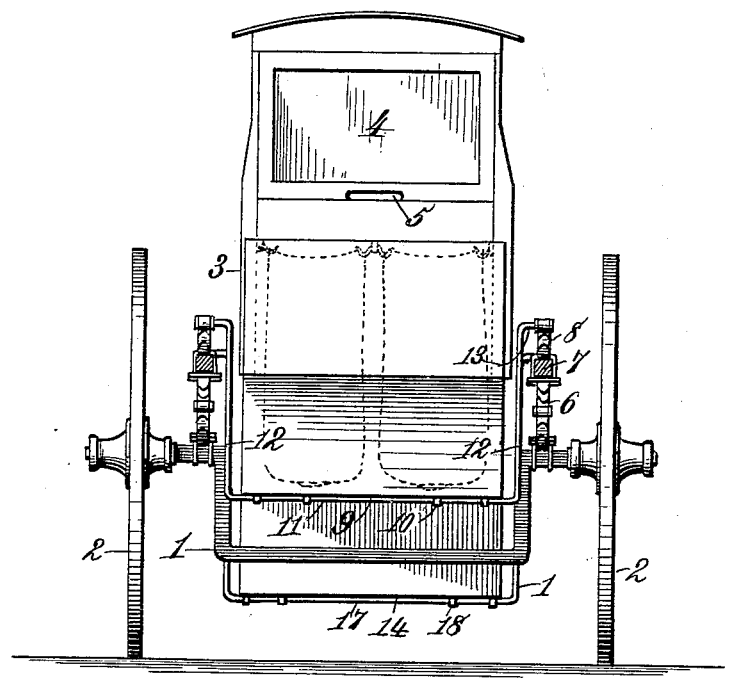
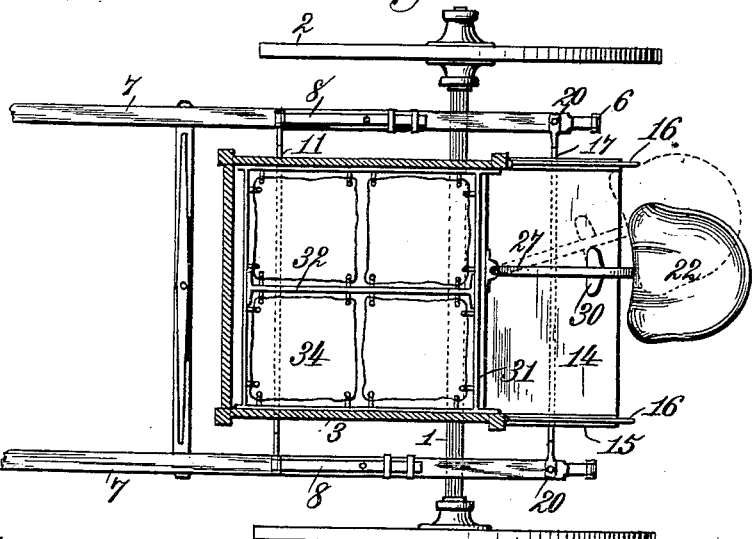
Witnesses.
Robert Gruett,
F. B. Keefer
Inventor.
George W. W. Sweeney.
By James L. Norris.
Atty.

UNITED STATES PATENT OFFICE.

GEORGE W. W. SWEENEY, OF NASHVILLE, TENNESSEE.

MAIL-CART.

SPECIFICATION forming part of Letters Patent No. 633,495, dated September 19, 1899.

Application filed February 1, 1899. Serial No. 704,127. (No model.)

*To all whom it may concern:*

Be it known that I, GEORGE W. W. SWEENEY, a citizen of the United States, residing at Nashville, in the county of Davidson and State of Tennessee, have invented new and useful Improvements in Mail-Carts, of which the following is a specification.

My invention relates to an improved mail-cart.

The object of my invention is to provide a vehicle for use in collecting mails with means whereby it shall be capable of having supported therein in an open or distended position a series of mail-bags and in such manner as to permit mail-matter to be readily placed therein and the bags to be readily removed from the vehicle.

A further object of the invention is to provide an improved construction of mail-cart affording easy and convenient access to the interior thereof from the rear and having a swinging seat-support attached to said rear portion, whereby said support and the seat carried thereby may be swung to one side to permit the mail-bags to be readily placed in position therein or removed therefrom.

Other objects of the invention relate to certain details of construction and operation of parts, which will more clearly appear from the detailed description hereinafter given.

In the accompanying drawings, Figure 1 is a side view of a vehicle constructed according to my invention, a wheel being removed. Fig. 2 is a front view of the same. Fig. 3 is a sectional plan view, and Fig. 4 is a perspective view of a detail.

The reference-numeral 1 indicates the axle of the vehicle, and 2 the wheels mounted on the ends thereof. I employ a drop-axle, such as shown in Fig. 2, to permit the bottom of the vehicle to be located relatively near to the ground, so that the operator may readily mount to or dismount from his position.

The numeral 3 indicates the body of the vehicle, in the front of which is located a glass panel 4, which may be raised and lowered in its casing in the ordinary manner. Removable glass panels are provided in the sides, as indicated at 4$^a$.

The numeral 5 indicates a rectangular or other opening in the front of the vehicle, through which the lines of the harness pass.

The numerals 6 6 indicate the main springs of the vehicle, which are supported on the axle in the ordinary manner. On the upper sides of these springs are secured shafts 7 7, and on the upper side of each shaft is secured a leaf-spring 8. The bottom portion or floor of the vehicle proper is indicated by the numeral 9. Extending across the bottom of the vehicle and held thereon by means of journal-clips 10 is a rod 11, which at opposite ends is bent upward, as shown at 12, to extend in a vertical direction parallel with each side of the vehicle, and the extremity of each vertical portion is bent outward at right angles, as shown at 13, and connected to the free end of the respective leaf-springs 8.

The numeral 14 indicates a step or platform provided at the rear of the vehicle and occupying a plane considerably lower than that of the bottom 9. Said step or platform is provided with inclosing sides 15, to the outer curved edge of each of which is secured a hand-rail 16, each of which is secured at its upper end to the side of the vehicle. Extending across the bottom of the step or platform 14 is a rod 17 similar to the rod 11 and secured in place by means of journal-clips 18. The rod 17 is likewise bent upward at opposite ends to extend in a vertical direction parallel with the sides 15, as indicated by the numerals 19. The outer extremity of each vertical extension 19 is bent outward at right angles and connected to the rear end of one of the shafts 7, as indicated at 20.

By supporting the body of the vehicle in the manner just described rocking or jolting thereof due to the motion of the horse is reduced to the minimum, the vibration being taken up by the springs 6 and 8. This result is facilitated by the manner of journaling the rods 11 and 17, which support the weight of the vehicle, on the bottom thereof, which construction permits the free action of the springs to be exercised in preventing sudden jerks or jars, as will be understood by those conversant with the art.

The numeral 21 indicates the seat-support, on the outer end of which is secured a seat 22. Said seat-support comprises a bar 23, having its upper portion curved and provided with means, such as apertures 24, for securing a seat thereto. At its opposite end said bar is bent substantially at right angles to itself, as shown at 25, and provided at its extremity with an aperture 26, by which means it may be pivotally secured to the platform 14 near the inner side and to one side of the center thereof. Secured at one end to the bar 23 is a brace-bar 27, having an outer curved end provided with a pintle 28, designed to seat in a socket 29, secured on the back of the step or platform 14. Formed integral with the part 25 of the bar 23 and projecting from opposite sides thereof, respectively, are flat bearing-plates 30, which rest upon the platform and brace the rod 23 laterally to prevent turning thereof under the weight of the operator, as will be understood. It will be seen that this construction permits the seat-support and the seat carried thereby to be swung to one side or the other in placing the mail-bags in or removing them from the mail-cart.

Within the vehicle and secured in a suitable manner to the sides thereof is a rectangular metal frame 31, opposite ends of which are centrally connected by a cross-bar 32. The bar 32 divides the frame 31 into two compartments, which are of a depth, respectively, to accommodate two mail-bags, as shown in Fig. 3. Suitable hooks 33 are provided around the frame 31 and on both sides of the bar 32, by means of which the bags 34 may be supported in an open or distended condition from said frame, thus permitting the mail-matter to be readily placed in said bags. The frame 31 is supported at such a height within the vehicle that the bottoms of the mail-bags hung thereon will not quite touch the bottom of the vehicle.

By supporting the bags in the manner described the collector may readily assort the mail as collected, putting first-class mail in one bag, second-class mail in another, and so on. Further, the construction of vehicle described permits the collector to mount to or dismount from his seat very readily, to which end the hand-rails 16 will be found of great assistance, and the combined advantages enumerated as resulting from my invention will greatly facilitate the rapidity with which the mail may be collected and delivered.

Having thus described my invention, what I claim as new is—

1. In a vehicle of the class described, the combination with the axle of a body having a rear platform or step, an elliptical spring secured on the axle near each end thereof, a shaft secured in its rear portion to the upper side of each spring, a spring secured on the upper side of each shaft and having a free end, a rod pivotally secured along the bottom of the vehicle and having at opposite ends integral vertical extensions secured at their outer ends, respectively to the free ends of said springs, and a rod pivotally secured along the bottom of said platform or step and having at opposite ends integral vertical extensions secured at their outer ends respectively to the rear ends of said shafts, substantially as described.

2. In a vehicle of the class described, the combination with the body having a rear depending platform or step of a seat-support pivotally mounted on said platform or step in an upright position and a seat secured at the outer end of said seat-support, substantially as described.

3. In a vehicle of the class described, the combination with the body having a rear platform or step of a seat-support comprising an upright rod having its lower end bent outward at right angles and resting on the platform or step and pivotally secured thereto at its outer extremity, a socket located above said pivoted end and in line therewith, and a brace-rod secured at one end to said upright rod and having its outer end curved downward and formed as a pintle to work in said socket, substantially as described.

4. In a vehicle of the class described, the combination with the body having a rear platform or step of inclosing sides for said platform or step having outer curved edges and a hand-rail secured along said curved edges, substantially as described.

5. In a vehicle of the class described, the combination with the body, of a rectangular frame supported therein, a bar connecting two opposite members of said frame centrally of their length, and hooks located around the inner sides of said frame and on opposite sides of said bar and designed to support a series of mail-bags in an open or distended position, substantially as described.

In testimony whereof I have hereunto set my hand in presence of two subscribing witnesses.

GEORGE W. W. SWEENEY.

Witnesses:
BRUCE S. ELLIOTT,
GEO. W. REA.